United States Patent [19]

Andersson

[11] Patent Number: 5,177,869
[45] Date of Patent: Jan. 12, 1993

[54] DOUBLE ROW ANGULAR CONTACT BALL BEARINGS AND A METHOD FOR THE MANUFACTURE THEREOF

[75] Inventor: Borje Andersson, Sandared, Sweden

[73] Assignee: SKF Nova AB, Gothenburg, Sweden

[21] Appl. No.: 574,742

[22] Filed: Aug. 30, 1990

Related U.S. Application Data

[63] Continuation of Ser. No. 309,472, Feb. 10, 1989, abandoned.

[30] Foreign Application Priority Data

Feb. 11, 1988 [SE] Sweden .................................. 8800460

[51] Int. Cl.$^5$ .............................................. B23P 11/00
[52] U.S. Cl. ........................... 29/898.062; 29/898.063
[58] Field of Search ................... 29/898.063, 898.066, 29/404, 898.061, 898.062; 384/512, 513

[56] References Cited

U.S. PATENT DOCUMENTS

| | | | |
|---|---|---|---|
| 3,036,365 | 5/1962 | Hanau | 29/898.063 |
| 3,579,782 | 5/1971 | Hallerback | 29/898.066 |

*Primary Examiner*—Joseph M. Gorski
*Attorney, Agent, or Firm*—Eugene E. Renz, Jr.

[57] ABSTRACT

A double row, angular contact ball bearing comprises of an integral inner race ring and an integral outer race ring, the outer race ring having at least one circumferential depression between the rows of balls and the inner race ring having a circumferentially radially extending end member axially outside each row of balls. The present invention also relates to a method of manufacturing double row, angular contact ball bearings by shaping sheet metal or tubular work pieces to finished inner or outer race rings by rolling, pressing or deep drawing, introducing rows of balls between the race rings, shaping the race rings to final form by rolling or pressing, and rolling the rows of balls constantly about the circumferential periphery of the inner race ring during the rolling or pressing of the race rings.

2 Claims, 2 Drawing Sheets

DOUBLE ROW ANGULAR CONTACT BALL BEARINGS AND A METHOD FOR THE MANUFACTURE THEREOF

This is a continuation of copending application Ser. No. 07/309,472 filed on Feb. 10, 1989 and now abandoned.

FIELD OF THE INVENTION

The present invention broadly relates to improvements in double row, angular contact ball bearings and methods for their manufacture. Specifically, the bearings of the present invention have an outer and inner race ring made of sheet metal material.

BACKGROUND OF THE INVENTION

Ball bearing assemblies with race rings made of sheet metal are not new per se. These known assemblies are simple and inexpensive to manufacture and are primarily employed where the demands for carrying capacity and precision are not too great. Typically, such bearing assemblies are manufactured with the outer and inner race rings pressed separately to their final, finished shape and then assembled in a known manner upon insertion of the balls. Various bearing types, such as deep groove or angular contact ball bearings, may be utilized. Because the race rings are initially shaped to final form prior to insertion of the balls, the bearing assemblies typically employ only a single row of balls. This allows for ease of assembly. However, double row bearings wherein the outer race rings is split so as to facilitate assembly are also known. For example, a bearing having a split outer race ring is disclosed in U.S. Pat. No. 3,732,606. Also, German Patent No. 25 18 129 describes a double row, angular contact ball bearings with race rings angularly adjustable relative to one another.

Bearing assemblies may be manufactured from a piece of sheet metal through a number of different methods. The most common method of manufacture involves pressing or rolling the race rings one at a time. However, the rings may also be shaped simultaneously during the process of assembling the bearing. U.S. Pat. No. 3,657,781 describes such a method of manufacturing a single row, deep groove ball bearing. Initially, two annular pieces of sheet metal are partially shaped by a known device, such as a shaping tool. In addition, a row of balls which are retained in position by means of the shaping tool during the shaping process, also act to partially shape the race rings. But because of the demands placed upon the tool and its design, the method is complicated and expensive. A further drawback of this known method is that it can only be used to manufacture single row ball bearings. Insertion of a second row of balls is not possible because an additional raceway cannot be formed by means of the tool and balls.

SUMMARY OF THE INVENTION

With the foregoing in mind, it is an object of the present invention to manufacture double row, angular contact ball bearings from a sheet of metal in an inexpensive and relatively simple manner. Furthermore, bearings produced by the present invention will attain a certain level of quality, thereby achieving a wide range of use in industry. To this end, and important and novel feature of the present invention is the ability to adjust the clearance in the bearing assembly between the balls and the race rings during the assembly process.

By the present invention, it is possible to provide a double row, angular contact ball bearing having outer and inner race rings satisfying the above desiderata. Each ring is manufactured from a single sheet of metal. Furthermore, the outer race ring has at least one circumferential depression between the rows of balls while the inner race ring has a circumferentially radially bulging axial end member located outside each row of balls.

In a preferred embodiment of the present invention, it is advantageous to fold the axial ends of the outer race ring radially inward. Thereafter, reinforcing means such as ribs may be inserted in the depression of the outer race ring between the rows of balls and in the spaces formed at the folding of the edges of the outer race ring. The reinforcing means make the bearing assembly more rigid, thus providing for greater strength.

In a further embodiment of the invention, reinforcing means such as ribs may be inserted in the depression of the outer race ring between the rows of balls and in the spaces formed at the folding of the edges of the inner race ring. Such reinforcing means give the bearing assembly more rigidity, thereby increasing the strength of the assembly.

The invention also incorporates a method for manufacturing double row angular contact ball bearings starting from tubular or sheet metal formed work pieces. At the outset, one or both work pieces may be shaped to finished or semi-finished inner or outer race rings by rolling, pressing or deep drawing, whereupon the balls are introduced between the race rings. The race rings then may finally be finish-shaped by rolling or pressing, wherein only the balls, which are kept constantly rolling, serve to counteract the pressure exerted upon the edges of the race rings during the rolling or pressing operation.

In accordance with another feature of the present invention, the outer race ring and one axial end of the inner race ring may be initially shaped by rolling or pressing. The other axial end of the inner race ring may then be shaped by rolling after introduction of the balls.

It is an object of the present invention to finish-shape the inner race ring by rolling before shaping the outer race ring. The outer race ring can subsequently be shaped to final form after introduction of the balls. Shaping of the outer race ring can be accomplished by depressing the ring between the rows of balls by means of a press roller.

Another object of the present invention is to manufacture double row, angular contact ball bearings wherein the inner race ring is finish-shaped after the introduction of the balls. The inner race ring rotates upon a shaft and an axial and radial pressure is exerted upon the ends of the ring. Thus, the end of the race ring may be displaced axially upward to form a raceway. However, the inner race ring may also be shaped by axial pressure after introduction of the balls in a previously finish-shaped outer race ring.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
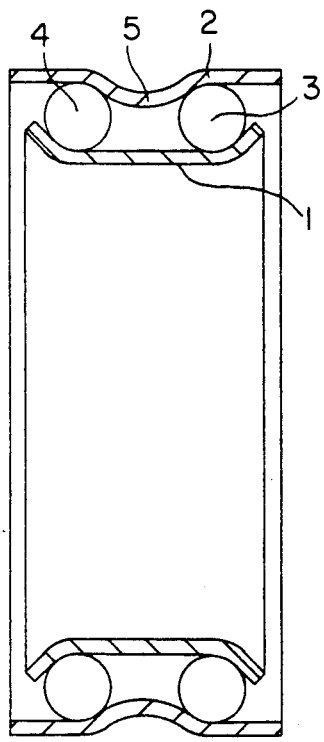
FIG. 1 is a longitudinal sectional view of a ball bearing assembly.

Referring now to the drawings and particularly to FIG. 1 thereof, there is shown a double row, angular contact ball bearing having an inner race ring (1), an outer race ring (2) and two rows of balls (3, 4) disposed between these race rings. The outer race ring (2) is provided with a circumferential depression (5) between the rows of balls, but is otherwise cylindrical. The inner race ring (1) is cylindrical in form, but has a circumferentially radially extending end member at its axial ends. The spaces formed by the circumferential depression (5) and the axial end members form a raceway for the rows of balls (3, 4). Thus, a two row, angular contact ball bearing is obtained. The bearing as shown in FIG. 1, has no retaining means for the balls (3, 4). Therefore, it incorporates a maximum number of balls. However, the invention is not limited to bearings without a retainer.

Figure 2:
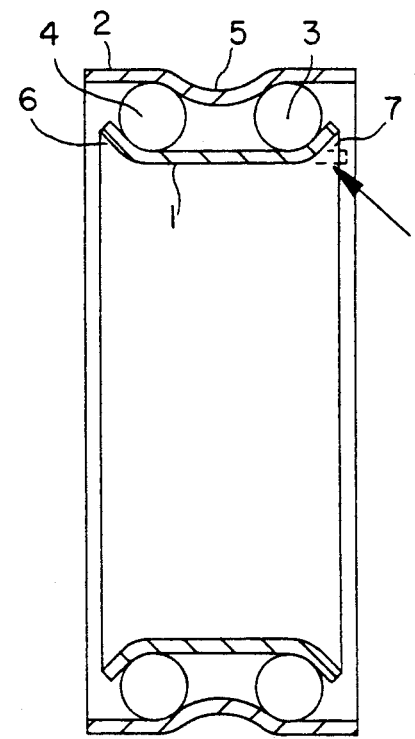
FIG. 2 illustrates a method for manufacturing the bearing according to the present invention.

A stage during the manufacture of a bearing according to FIG. 1 is illustrated in FIG. 2. The outer race ring (2) is fabricated prior to the assembly of the bearing. Starting from a tubular sheet of metal, a circumferential depression (5) is rolled upon the ring (2). The inner race ring (1) is partially shaped before the assembly process and a radially extending edge (6) rolled at one axial end of a piece of tube. The opposite axial end (7) remains unshaped until after the balls (3, 4) have been introduced. By displacing the finished outer race ring (2) axially relative to the semi-finished inner race ring (1), the balls (3,4) may be inserted into the raceways. The final stage in the manufacturing process is the clamping of the semi-finished bearing in a fixture and rolling the axial end (7) of the inner race ring (1), as shown by the arrow in FIG. 2. To ensure that the raceways in the bearing are smooth and uniform, the balls (3, 4) must continuously rotate during the rolling of the axial end (7). To this end, either the inner race ring (1) or the outer race ring (2) rotates during the rolling operation, thereby causing the balls (3, 4) to rotate.

By applying a carefully adapted pressure against the end (7) during the rolling operation, a bearing entirely free from play can be obtained. Normally, this objective is achieved by adjusting the clearance between the inner (1) and outer (2) rings until a desired tolerance or not tolerance results. One advantage of the present invention is that this operation, which is both expensive and time consuming, can be entirely eliminated.

Since the raceways have been rolled at the same time the balls are rotating, a surface smoothness in the tracks almost as high as the surface smoothness for ground rings is achieved. In addition, the frictional resistance of the present bearing is almost as low as a corresponding bearing having ground rings. Furthermore, the rolling of the end (7) in the inner race ring (1) by applying a pressure is accomplished with only the balls (3) counteracting the applied pressure. Therefore, it is not necessary to use any external pressure means other than the balls or to use any other device for maintaining the balls in position during the rolling operation. This is a considerable improvement over earlier known methods.

Figure 3:
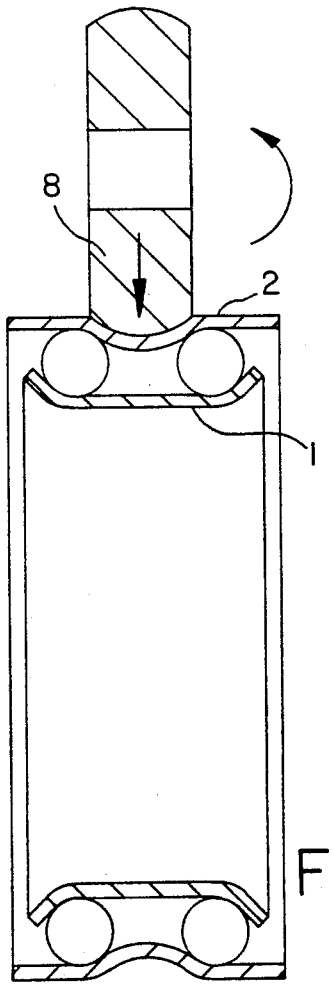
FIG. 3 shows an alternative method of manufacturing the bearing assembly.

Another method of manufacturing a bearing according to the present invention is shown in FIG. 3. The inner race ring (1) is finish-shaped prior to assembly. The outer race ring (2), which was initially tube-shaped, is circumferentially depressed between the rows of balls (3, 4) by means of a press roller (8). The outer ring (2) continuously rotates while the depression (5) of the ring (2) is formed by the press roller (8) resulting in a bearing having the same properties as the bearing embodied in FIG. 2.

Figure 4:
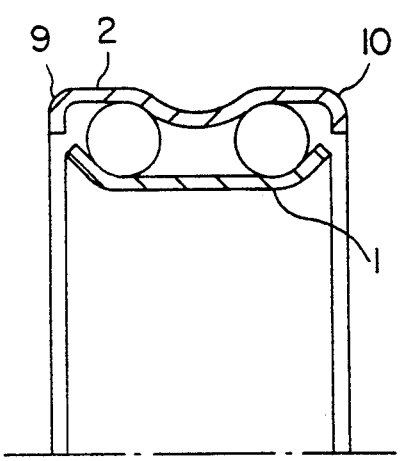
FIG. 4 is a longitudinal sectional view similar to FIG. 1 showing a modified form of the bearing assembly in accordance with the present invention.

FIG. 4 illustrates a bearing according to the present invention having the same inner race ring (1) as in the earlier figures, but wherein the two axial ends (9, 10) of the outer race ring (1) have been rolled radially inward. These rolled axial ends (9, 10) form a protective edge to keep out particles such as dust or dirt which may inhibit the functioning of the assembly.

Figure 5:
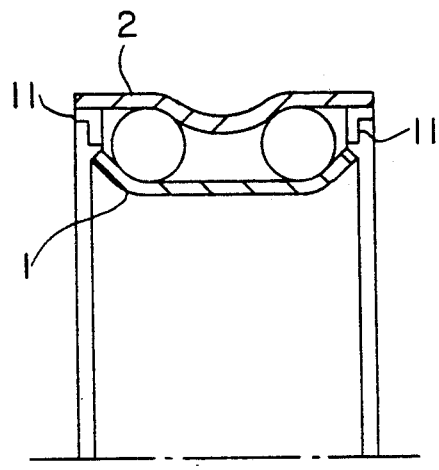
FIG. 5 shows a further embodiment of the bearing in accordance with the present invention.

A further embodiment of the present invention can be seen with reference to FIG. 5. FIG. 5 shows a bearing assembly wherein a cover (11) has been introduced to protect the bearing. Because the outer race ring (2) has a larger axial length than the inner race ring (1), the cover (11) may be arranged in the space formed by the outer axial ends of the race rings.

Figure 6:
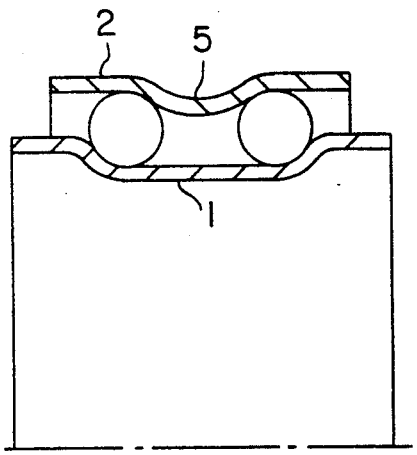
FIG. 6 is a further embodiment of the bearing of FIG. 1.

Another modification of the bearing according to the present invention is shown in FIG. 6. The inner race ring (1), which was initially tube-shaped, has a larger axial length than the inner ring of FIG. 1. Therefore, the bearing assembly has an inner race ring (1) projecting outside the outer race ring (2). This modified bearing is less susceptible to external axial forces because of the increased surface area of the inner ring (1). Another advantage of the modified bearing is that the axial edges of the inner race ring (1) may be folded and reinforcing means such as ribs may be inserted in the spaces formed by the folding to make the bearing more rigid. Likewise, reinforcing means may be positioned in the circumferential depression (5) in the outer race ring (2) to further increase the rigidity of the bearing. The increased rigidity of the bearing assembly provides greater strength.

Figure 7:
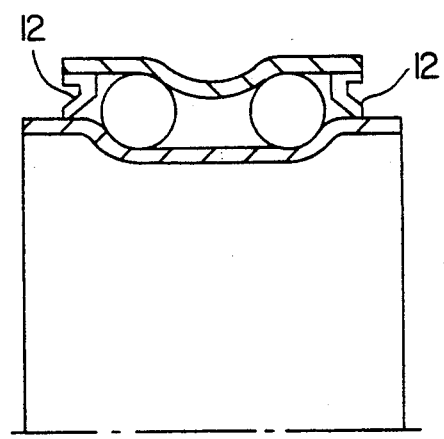
FIG. 7 is illustrative of a modified embodiment of a bearing assembly according to the invention.

In accordance with another feature of the present invention, a sealing member (12) may be inserted in the spaces formed by the axial ends of the race rings. As shown in FIG. 7, the sealing member protects the bearing assembly from foreign particles, such as dust, dirt or liquids, which may be introduced during operation of the assembly.

Figure 8:
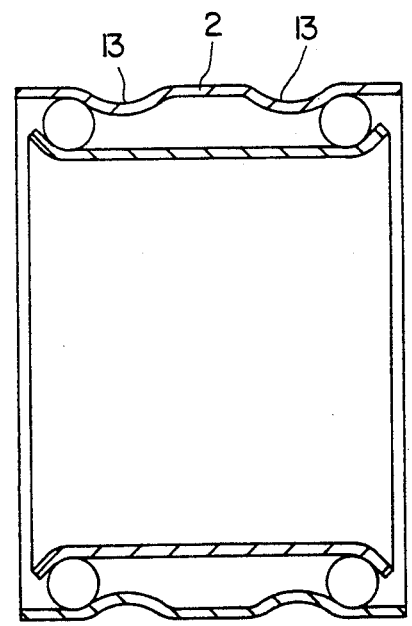
FIG. 8 shows yet another modified embodiment of the bearing illustrated in FIG. 1.

FIG. 8 shows yet another embodiment of a bearing according to the present invention. The race rings have a larger axial length than the rings illustrated in FIGS. 1-7, and the outer race ring (2) is equipped with two circumferential depressions (13). The increased axial length of the race rings allows them to withstand greater axial forces which may be placed upon the assembly, during normal operating procedures.

While particular embodiments of the present invention have been illustrated and described herein, it is not intended to limit the invention, and changes and modifications may be made therein with the scope of the following claims. Many different variations of the present invention may be produced by the methods of manufacture disclosed herein. Despite the inexpensive method of manufacture, bearing assemblies fabricated from the methods illustrated and described herein are of the highest precision and quality.

What is claimed is:

1. A method of manufacturing double row, angular contact ball bearings having an integral inner and outer race rings and two rows of balls engaging in axially spaced confronting inner and outer raceways of the rings consisting of the steps of:
    a) shaping sheet metal tubular work pieces into inner and outer race rings of which the inner race rings is only partially finished such that the race rings define one partially finished raceway;
    b) introducing rows of balls between the race rings in rolling contact with said inner and outer race rings;
    c) bending the inner race ring at an axial end thereof in the region of the partially finished raceway to final finished form, thereby forming the one partially finished raceway into a final finished raceway, whereby the balls are permanently encapsulated in two rows forming a bearing free from play.

2. A manufacturing double row, angular contact ball bearings having integral inner and outer race rings and two rows of balls engaging in axially spaced confronting inner and outer raceways of the rings consisting of the steps of:
    a) providing a first sheet metal tubular work piece with a circumferential radially inward depression, thus providing a finished outer ring having a pair of axially spaced finished outer raceways located at opposite radial surface portions of said depression;
    b) providing a second sheet metal tubular work piece having a pair of axially spaced inner raceways adjacent opposite axial ends, one of the raceways being partially finished, thereby defining a partially finished inner ring;
    c) introducing rows of balls between the finished outer ring and partially finished inner ring;
    d) rotating the rings relative to one another, thereby effecting rolling the rows of balls constantly about the circumferential periphery of the inner ring; and
    e) simultaneously with the rotating of step d) bending the inner ring at an axial end thereof, thereby shaping the partially finished raceway to a final finished form whereby the balls are permanently encapsulated in two rows forming a bearing free from play.

* * * * *